United States Patent [19]
Kotani et al.

[11] Patent Number: 4,976,537
[45] Date of Patent: Dec. 11, 1990

[54] DISTANCE MEASURING DEVICE WITH PLURAL DIFFERING REFERENCE VOLTAGES

[75] Inventors: Takaaki Kotani; Seiji Takada, both of Tokyo, Japan

[73] Assignee: Fuji Photo Film Co., Ltd., Kanagawa, Japan

[21] Appl. No.: 257,041

[22] Filed: Oct. 12, 1988

[30] Foreign Application Priority Data

Oct. 12, 1987 [JP] Japan ................... 62-256934
Oct. 12, 1987 [JP] Japan ................... 62-256935
Oct. 12, 1987 [JP] Japan ................... 62-256938

[51] Int. Cl.⁵ ............................ G01C 3/00
[52] U.S. Cl. ...................... 356/1; 250/201.6; 354/403; 356/4
[58] Field of Search .................. 356/1, 4, 5; 250/201 AF, 201.6; 354/403

[56] References Cited

U.S. PATENT DOCUMENTS

| 3,936,187 | 2/1976 | Momose | 356/1 |
| 3,951,549 | 4/1976 | Fowler et al. | 356/5 |
| 4,077,718 | 3/1978 | Graham, Jr. et al. | 358/4 |
| 4,135,815 | 1/1979 | Masunaga et al. | 356/4 |
| 4,274,735 | 6/1981 | Tamura et al. | 356/1 |
| 4,313,654 | 2/1982 | Matsui et al. | 356/1 X |
| 4,575,211 | 3/1986 | Matsumura et al. | 354/403 |
| 4,575,237 | 3/1986 | Suzuki | 356/1 |
| 4,582,424 | 4/1986 | Kawabata | 356/1 |
| 4,707,128 | 11/1987 | Coles | 356/4 |
| 4,740,806 | 4/1986 | Takehana | 354/403 |

FOREIGN PATENT DOCUMENTS 54-119267 9/1979 Japan .
55-33005 8/1980 Japan .
56-29112 3/1981 Japan .

Primary Examiner—Thomas H. Tarcza
Assistant Examiner—Linda J. Wallace
Attorney, Agent, or Firm—Young & Thompson

[57] ABSTRACT

A distance measuring device is provided with a plurality of comparators which are respectively connected to a plurality of light receiving elements for receiving light reflected from a subject. The plurality of comparators detect the levels of output signals of the light receiving elements. The comparators are supplied with reference voltages to be used for comparison with the output signals, the reference voltages being set different for each comparator according to the distance from whic the respective light receiving element receives light.

19 Claims, 14 Drawing Sheets

FIG. 10

| LIGHT RECEIVING ELEMENT | | EV VALUE | | | | | | | | | | |
|---|---|---|---|---|---|---|---|---|---|---|---|---|
| | | 18 | 17 | 16 | 15 | 14 | 13 | 12,11 | 10~8 | 8<EV | | |
| S1 | | N5 | N4 | N3 | N3 | N2 | N2 | N1 | N1 | N2 (F12.1) | | |
| S2 | | N5 | N4 | N3 | N3 | N2 | N2 | N2 (F12.1) | N2 (F12.1) | N2 (F12.1) | | |
| S3 | | N6 | N6 | N5 | N5 | N4 | N4 | N3 | N3 | N4 (F7.8) | | |
| S4 | | N6 | N6 | N5 | N5 | N4 | N4 | N4 (F7.5) | N4 (F9.8) | N4 (F9.0) | | |
| | | N6 | N7 | N7 | N7 | N6 | N6 | N5 | N5 | N6 (F8.0) | | |
| | | N6 | N7 | N7 | N7 | N6 | N6 | N6 (F8.0) | N6 (F8.0) | N6 (F6.5) | | |
| S5 | | N6 | N7 | N8 | N8 | N8 | N7 | N7 | N7 | N7 (F5.3) | | |
| | | N6 | N7 | N8 | N8 | N8 | N7 | N7 | N7 (F5.3) | N7 (F4.2) | | |
| | | N6 | N7 | N8 | N8 | N8 | N8 | N7 | N9 | N9 (F2.9) | | |
| S6 | | N6 | N7 | N8 | N9 | N9 | N9 | N10 | N10 | N10 (F2.9) | | |

DISTANCE MEASURING DEVICE WITH PLURAL DIFFERING REFERENCE VOLTAGES

FIELD OF THE INVENTION

The present invention relates to an active-type distance measuring device for use with photographic cameras, electronic cameras, video cameras or the like.

BACKGROUND OF THE INVENTION

In active-type distance measuring devices commonly found in recent compact cameras, a light beam is projected from a projector onto a subject to be photographed, and light reflected from the subject is detected by a light receiving sensor. The light receiving sensor has a plurality of slender light receiving elements disposed side by side in the direction of a base line. The distance to the subject is obtained, based on the position of the light receiving element on which reflected light falls, the light receiving element being identified electrically.

DISCUSSION OF THE PRIOR ART

Various types of such active-type distance measuring devices are known. For example, in a distance measuring device disclosed in Japanese Patent Publication No. 55-33005, a plurality of light receiving elements are disposed in the direction of a base line. A comparator with the same reference voltage applied thereto is connected to each light receiving element so that the light receiving element on which reflected light falls can be identified through comparison between the reference voltage and an output from the light receiving element. The distance measuring device disclosed in Japanese Patent Publication No. 55-33005, however, poses a problem: if the reference voltage is set so as to make the light receiving element on the far range side match weak reflected light from a subject in the far distance range, and if strong reflected light falls on a light receiving element on the near range side, not only will the element concerned generate a false signal but also the neighboring elements will generate false signals due to cross-talk, thus resulting in erroneous distance measurement.

Such cross-talk will be further described in detail with reference to FIGS. 12A and 12B. As is shown in FIG. 12A, if reflected light of high intensity having a pattern 70 is applied to a light receiving element S4 among light receiving elements S1 to S6 disposed in the direction of a base line, a halo 71 concentric with the reflected light pattern 70 often appears, resulting in the generation of outputs from adjacent light receiving elements S3 and S5 as shown in FIG. 12B. If reflected light of high intensity is applied from a subject to the light receiving element S4, the adjacent light receiving elements S3 and S5 often produce outputs due to cross-talk, regardless of the small size of the halo 70 present within the area of the element S4. In such a case, assuming that a single comparator with a reference voltage $V_L$ is connected to each light receiving element S3 to S5, a high level signal (H signal) is outputted from each comparator which received light reflected from the subject. Therefore, there occurs an erroneous judgment that reflected light fell also on the light receiving elements S3 and S5.

On the other hand, assuming that the reference voltage of the comparator is set at $V_H$, if reflected light of low intensity from a subject falls on the light receiving element S4, the element produces an output whose level is low as indicated by a one-dot-chain line. Thus, a high level signal indicating that reflected light fell on a light receiving element is not produced by any comparator.

In consideration of the above problem, in a distance measuring device disclosed in Japanese Patent Laid-open Publication No. 56-29112, if a plurality of light receiving elements produce outputs, the reference voltages of the comparators connected to such elements are changed while referring to the maximum level of the outputs, thus avoiding the generation of false signals. With the distance measuring device disclosed in that Japanese Patent Laid-open Publication, however, the signal processor thereof becomes complicated and its cost becomes burdensome.

In a distance measuring device disclosed in Japanese Patent Laid-open Publication No. 54-119267, not only is there provided a light receiving element on which reflected light falls, but also if the two or three adjacent light receiving elements receive the reflected light, a signal is outputted which represents a mean subject distance of those distances obtained from the elements on which the reflected light falls. With the distance measuring device disclosed in Japanese Patent Laid-open Publication No. 54-119267, however, it becomes necessary to set reference voltages low in order to separate a small output from noise, because the output levels of light receiving elements differ greatly from each other. As a result, a false distance measurement occurs due to cross-talk.

Conventional active-type distance measuring devices commonly use a flash bulb as a light projector for projecting a distance measuring light beam onto a subject. The flash bulb can project a strong light beam so that light reflected even from a far distant subject can be reliably detected with a light receiving element. The flash bulb projects an instantaneous light so that the light reflected from a subject also falls instantaneously on a light receiving element. Thus, the output of a light receiving element is required to be picked up with precise timing. In view of this, the output of a light receiving element has been picked up heretofore in the manner as shown in the timing chart of FIG. 17. In particular, light emission (indicated by a broken line) timing d2 of a flash bulb delays from the time d1 when a discharge trigger signal is applied, and there occurs a time delay of a light emission peak from the time when the flash bulb emits light. Thus, a latch timing signal is arranged to be outputted at a time d3 after the time lapse D1 from the time d1. If the output from a light receiving element has a level equal to or higher than the threshold level, then a latch output is generated at the time d3 when the latch timing signal is outputted. The latch output indicates that reflected light was detected by the light receiving element, and is supplied to a signal processor which outputs a distance measuring signal, and to other circuits.

In the above-described latch method, it is necessary to set the time d3 when the latch timing signal is generated within the period $\Delta D$ during which the output of a light receiving element holds a level equal to or higher than the threshold level. To this end, it becomes necessary to correctly determine the period D1 from the discharge trigger signal generating time d1 to the latch timing signal generating time d3. However, the response characteristic of components of the flash bulb circuit and the discharge characteristic of the flash bulb may fluctuate for each device. In addition, the response characteristic of the signal processor is not always the same for each device. As a result, the period D2 from the discharge trigger signal generating time d1 to the light emission time of a flash bulb, and the period ΔD during which the output of a light receiving element remains equal to or higher than the threshold level, may fluctuate for each device. Thus, even if the period D1 from the discharge trigger signal generating time d1 to the latch timing signal generating time d3 is precisely determined, the latch timing signal generating time d3 may shift outside of the period ΔD, thus posing a problem that a correct latch output is not generated.

OBJECTS OF THE INVENTION

It is a principal object of the present invention to provide a distance measuring device wherein distance measurement is not influenced by a change in intensity of reflected light due to a change in subject distance and by cross-talk or the like, and the signal processor is not complicated in construction.

It is another object of the present invention to provide a distance measuring device which can reliably pick up the output of a light receiving element.

SUMMARY OF THE INVENTION

The above and other objects and advantages of the present invention can be achieved by providing a comparator for each of a series of light receiving elements disposed side by side in the direction of a base line, and by applying a different reference voltage to each comparator by means of reference voltage supplying means. Instead of providing only one comparator for each light receiving element, two or more comparators may be provided for each light receiving element with different reference voltages supplied thereto.

Furthermore, in order to correctly pick up the output of a light receiving element, there is provided control means for allowing the pick-up of the output of a light receiving element for only a predetermined period of time after a discharge trigger signal is applied to a flash bulb.

According to the present invention, the reference voltages of a plurality of comparators of which one or more are provided for each of a plurality of corresponding light receiving elements, are set to be different from each other. Therefore, a good distance measuring function can be obtained irrespective of a change in reflected light intensity due to a change in subject distance, and without influence by a false signal due to cross-talk. In the case wherein a plurality of comparators are provided for each light receiving element, light reflected from a subject can be detected reliably, and a false signal is not generated upon the application of reflected light with a halo or reflected light of high intensity which may cause cross-talk, thus ensuring precise distance measurement. Furthermore, since means for controlling the pick-up of the output signal of a light receiving element is provided, the output of a light receiving element can be stored in storage means at a proper timing even when the discharge characteristic of a flash tube and the response characteristic of circuit elements fluctuate for each device.

BRIEF DESCRIPTION OF THE DRAWINGS

Other objects and advantages of the present invention will become apparent from the following detailed description when read in conjunction with the accompanying drawings, wherein:

FIG. 10 is an AF table to be used in determining a lens position;

DETAILED DESCRIPTION OF THE PREFERRED EMBODIMENTS

Figure 1:
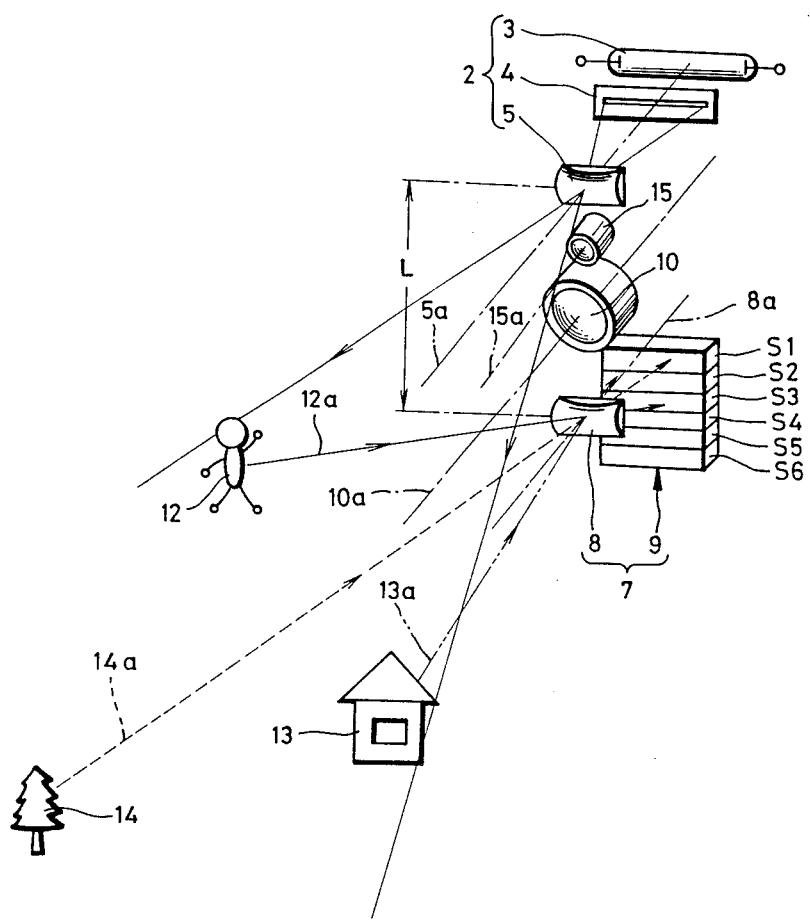
FIG. 1 shows diagrammatically the optical system of a distance measuring device of this invention.

FIG. 1 shows diagrammatically the optical system of the distance measuring device of this invention. A first light projecting unit 2 is used for projecting near-infrared light onto a subject within an ordinary photographing range, and is comprised by a flash bulb 3 for emitting near-infrared light, a slit plate 4 for shaping the light from the flash bulb 3 in the form of slit, and a light projecting lens 5. A light receiving unit 7 is comprised by a light receiving lens 8 and a light receiving sensor 9. The optical axes 5a and 8a of the light projecting lens 5 and light receiving lens 8 are parallel to the optical axis 10a of a taking lens 10, and are spaced apart from each other by a base line length L. The light receiving sensor 9 is comprised by fine light receiving elements S1 to S6 of laterally elongated shape disposed in the direction of the base line.

As a slit of light is projected toward a subject from the first light projecting unit 2, a fraction of the light is reflected from the subject 12 within the near distance range, and the reflected light 12a is incident, e.g., on a light receiving element S3 via the light receiving lens 8. If a fraction of the slit of light is reflected by a subject 13 within the middle distance range or by a subject 14 within the far distance range, the reflected light 13a or 14a is incident, e.g., on a light receiving element S2 or S1. Thus, by identifying the light receiving element of the light receiving sensor 9 on which the light reflected from the subject falls, it is possible to obtain the distance to the subject. Even if a main subject is shifted from the center of a photographing frame, the distance-measuring light beam can reach the subject if a slit of light is used. Therefore, the cumbersome operation of standard distance measuring or re-framing after distance measurement becomes unnecessary. Instead of a slit of light, a spot of light may be used for measuring distance.

To enable distance measurement in the close-up photographing range (macrophotography range), there is provided an infrared light emission diode (hereinafter indicated by IRED) 15 for projecting a spot light beam onto a subject. The optical axis of IRED 15 is inclined toward the light receiving sensor 9 relative to the optical axis 5a of the light projecting lens 5 by an angle $\theta$. With IRED 15, it becomes possible to receive light reflected from a subject within a closer range than the nearest distance at which the subject can be photographed when distance is measured using the slit of light from the first light projecting unit 2.

Figure 3:
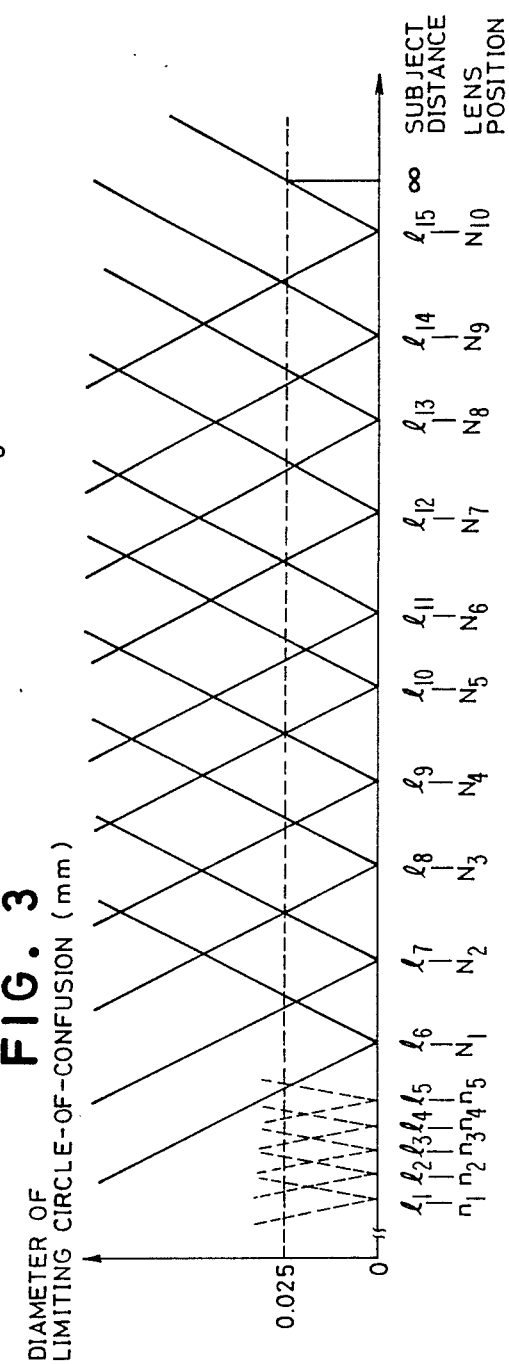
FIG. 3 illustrates a relationship between the subject distance and the taking lens position.

FIG. 3 shows the position of the taking lens 10 relative to the subject distance. N1 to N10 represent the lens positions within the ordinary photographing range, the lens positions being determined based on the distances measured using the slit of light from the first light projecting unit 2. n1 to n5 represent the lens positions within the close-up photographing range, the lens positions being determined based on the distances measured using the spot of light from IRED 15. A subject at any one of distances $l_1$ to $l_{15}$ will be in focus when the lens is set at the corresponding position n1 to n5 or N1 to N10. Assuming that the diameter of the limiting circle of confusion to be regarded as in focus is 0.025 mm, a subject at any distance from approximately $l_1$ to infinity can be brought into focus, given the depth of focus of the taking lens 10.

Figure 4:
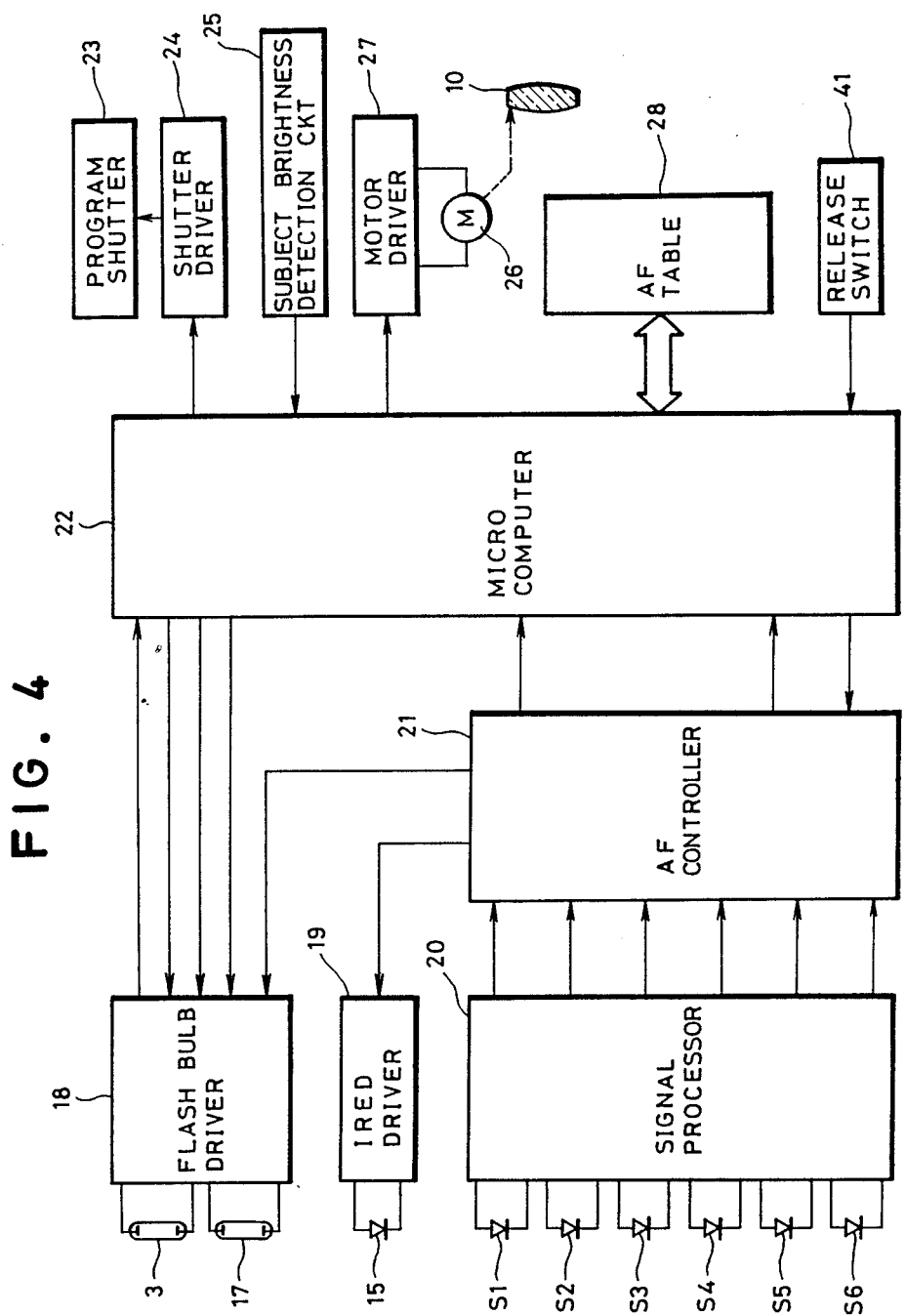
FIG. 4 is a block diagram showing the arrangement of electric circuits of the distance measuring device.

The flash bulb 3, light receiving sensor 9 and IRED 15 are used in combination with the circuit shown in FIG. 4. A flash bulb 3 for distance measurement and a flash bulb 17 for illuminating the subject during photographing are controlled by a flash bulb driver 18, and IRED 15 by an IRED driver 19. Light receiving elements S1 to S6 constituting the light receiving sensor 9 are connected to a signal processor 20 which processes the outputs of the light receiving elements S1 to S6. The signal processor 20 is also connected with an AF controller 21 which converts the outputs of the signal processor 20 into distance measuring data which are in turn inputted to a microcomputer 22. The AF controller 21 outputs trigger signals to the flash bulb 3 and IRED 15 at proper timings, which will be described in more detail later.

Connected to the microcomputer 22 are the flash bulb controller 18, AF controller 21 and other circuits including a shutter driver 24 for controlling the opening and closing of a program shutter 23, a subject brightness measuring circuit 25, a motor controller 27 for driving a motor 26, and an AF table 2S in which the lens positions of the taking lens 10 are stored in correspondence with the inputted measured data from the AF controller 21.

Figure 5:
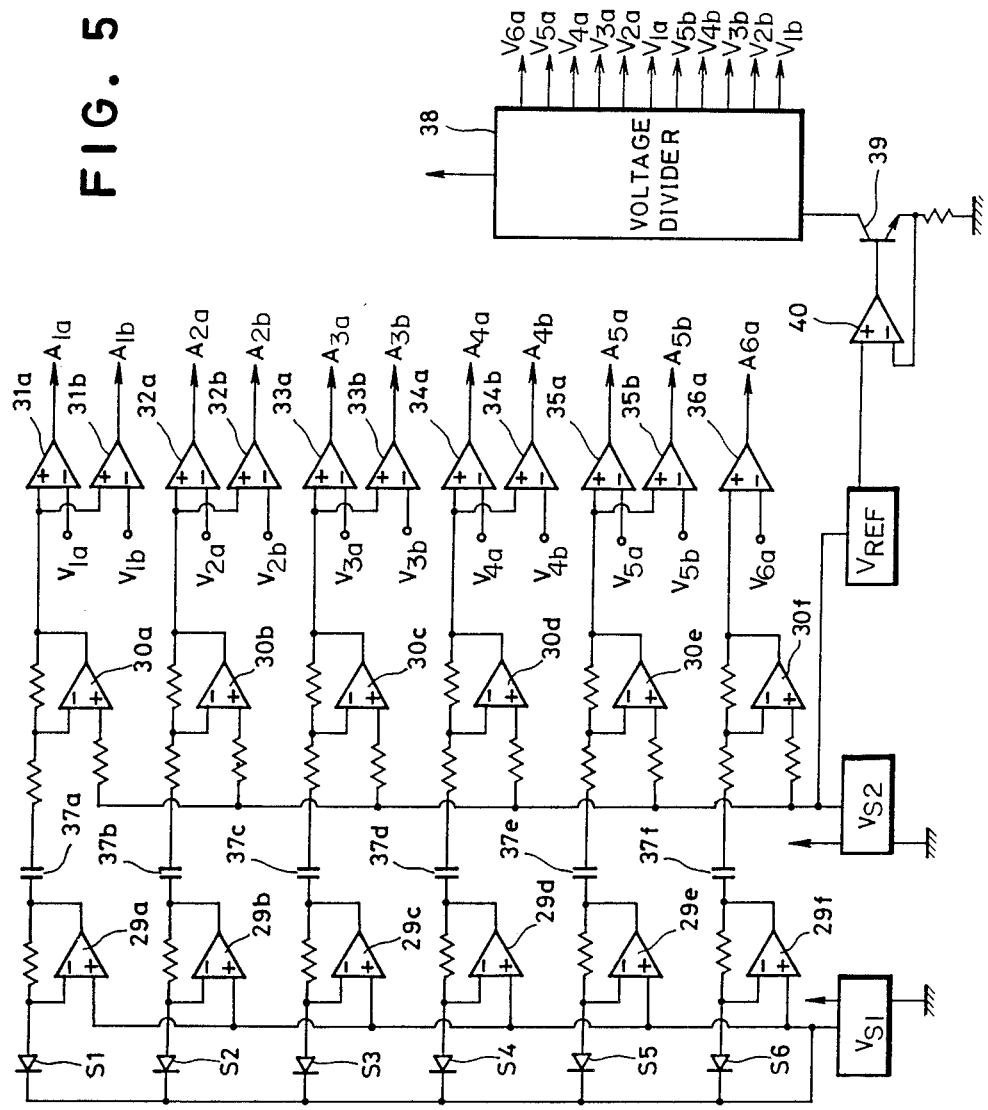
FIG. 5 shows an example of a signal processor used in the distance measuring device shown in FIG. 4.

FIG. 5 is a current diagram of the signal processor 20. Photocurrents from the light receiving elements S1 to S6 are transformed into voltage signals by first stage operational amplifiers 29a to 29f to which a reference voltage Vs1 is applied. The obtained voltage signals have d.c. components, i.e., arising from external light or sunlight and the like which are removed by low frequency eliminating capacitors 37a to 37f connected to the output terminals of the first stage operational amplifiers 29a to 29f. Therefore, signals with d.c. components removed therefrom are supplied to second stage operational amplifiers 30a to 30f to which a reference voltage Vs2 is applied. The signals amplified by a certain amplification factor by the second stage operational amplifiers 30a to 30e are supplied to comparators 31a, 31b, 32a, 32b, ..., 35a, 35b, two for each light receiving element S1 to S6. A signal from the operational amplifier 30f is supplied to the single comparator 36a.

Figure 12:
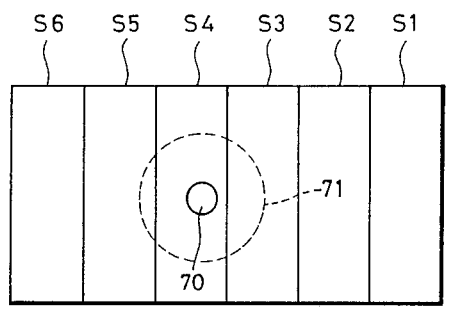
FIG. 12A illustrates the pattern of reflected light incident on a light receiving element, whilst
FIG. 12B shows the outputs of light receiving elements.
Figure 12:
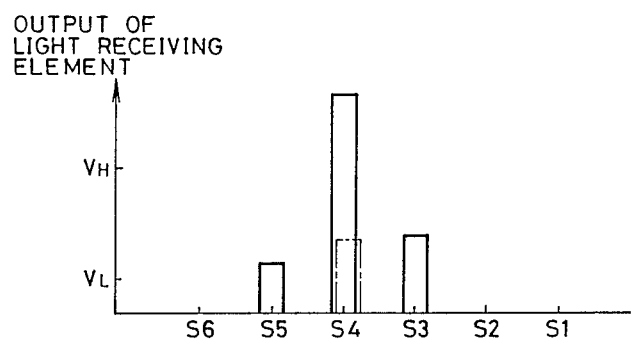

The comparators 31a, 31b, 32a, 32b, ..., 35a, 36a are supplied with reference voltages V6a to V1b from a voltage divider 38. A transistor connected in series to the voltage divider 38 regulates the amount of current to the divider 38 under control of an operational amplifier 40 to which a reference voltage Vref is applied. Of the reference voltages V6a to V1b, the reference voltage V6a is highest, and the reference voltage V1b is lowest. An output of the light receiving element S1 for example is amplified at certain amplification factors by the first and second stage operational amplifiers, and the obtained signal is compared with two high and low reference voltages V1a and V1b. If the signal is equal to or greater than the reference voltage V1a or V1b, a high level signal (H signal) is outputted from the output terminal of the comparator 31a or 31b, whereas if the signal is less than the reference voltage V1a or V1b, a low level signal (L signal) is outputted. In the above manner, the outputs of the light receiving elements S1 to S6 are amplified and compared with two high and low reference voltages Vna and Vnb by two respective comparators so that two binarized series of output signals Ana and Anb are obtained. The reference voltages Vna and Vnb supplied to the comparators 31a, 31b, 32a, 32b, ..., 35a, 35b correspond to the reference voltages $V_H$ and $V_L$ shown in FIG. 12B. As will be described in detail later, one of a pair comprised by two comparators is selected to obtain an output signal Ana or Anb in accordance with the intensity of the reflected light.

In this embodiment, the reference voltage Vna, Vnb is set lower for a light receiving element nearer to the light receiving element S1 which receives light reflected from a subject at a greater distance, and is set higher for a light receiving element nearer to the light receiving element S6 which receives light reflected from a subject at a lesser distance. Namely, the reference voltages Vna and Vnb are set as V6a > V5a > V4a > ... > V1a, and V5b > V4b > ... > V1b. Such an arrangement is employed in consideration of the fact that generally the intensity of light reflected from a subject at a greater distance is low as compared with that from a subject at a lesser distance. With such an arrangement, light reflected from a subject such as human skin having a uniform reflectivity can be detected fairly well even with fixed amplification factors of the first and second stage operational amplifiers.

Figure 6:
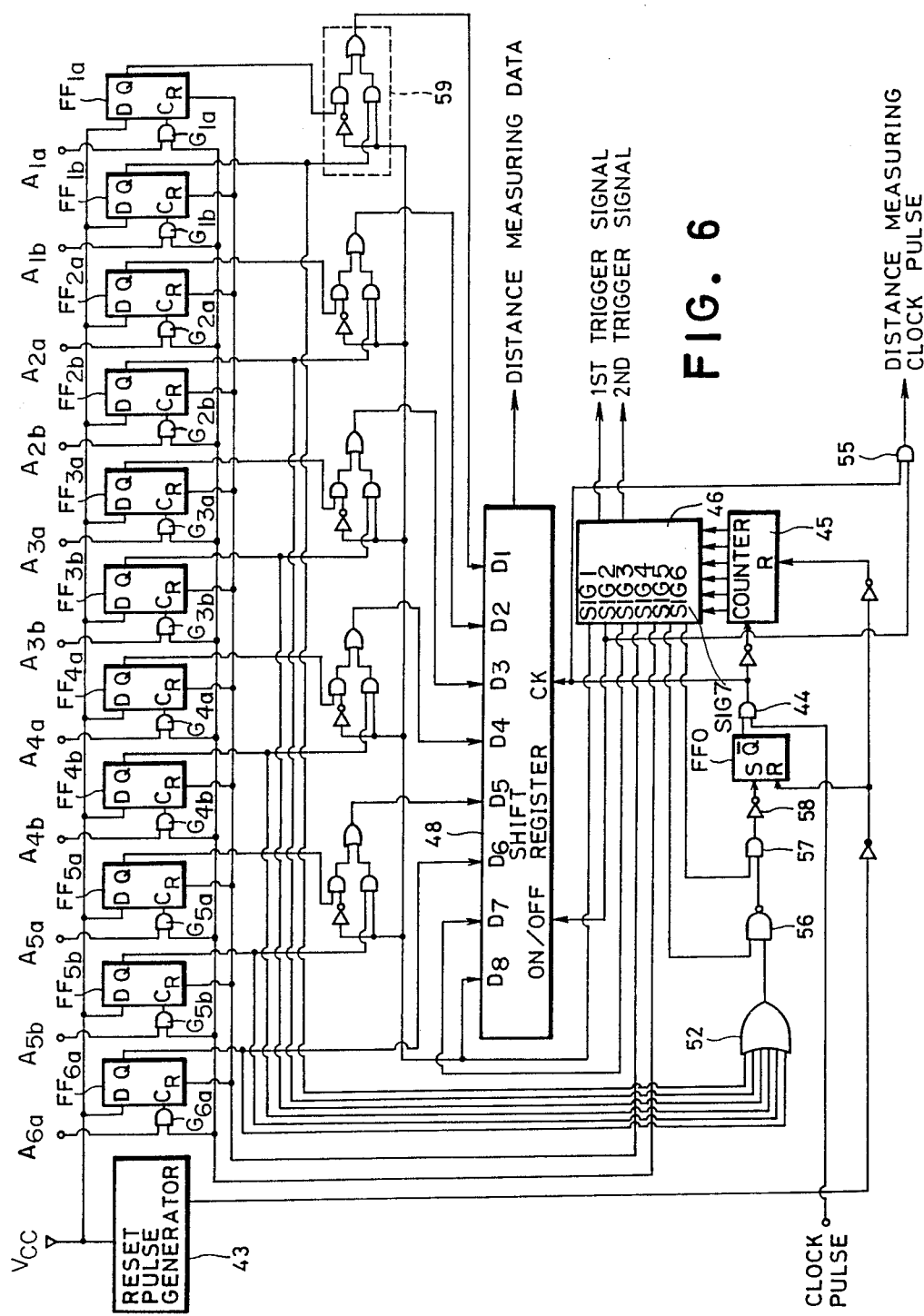
FIG. 6 is a circuit diagram showing an example of an AF controller.

FIG. 6 is a circuit diagram showing an example of the AF controller. H or L output signals A1a, A1b, A2a, ..., A6a at the output terminals of the comparators 31a, 31b, 32a, 32b are supplied via AND gates Gna, Gnb to the clock terminals of respective D-flip-flops FFna, FFnb (hereinafter simply indicated by FFna, FFnb).

In addition to FFna, FFnb, the AF controller 21 is provided with a reset pulse generator 43 for outputting a reset pulse at a predetermined time lapse after a power source Vcc is turned on, a counter 45 for counting clock pulses supplied from the microcomputer 22, a decoder 46 for receiving a count value from the counter and outputting a control pulse in accordance with which the distance measuring sequence is performed, a shift register 48 for receiving the outputs of FFna, FFnb and transforming them into distance measuring data, and other circuit elements. Selectors 59 are also provided which are used to select one of the outputs from paired FFna and FFnb in accordance with a signal Sigl from the decoder 46 and send it to the shift register 48.

Figure 7:
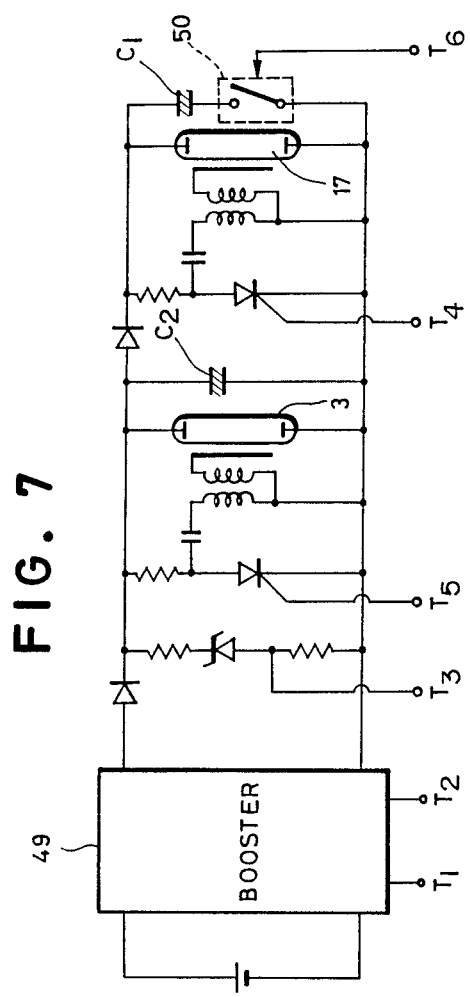
FIG. 7 is a circuit diagram showing an example of a flash bulb driver.
Figure 8:
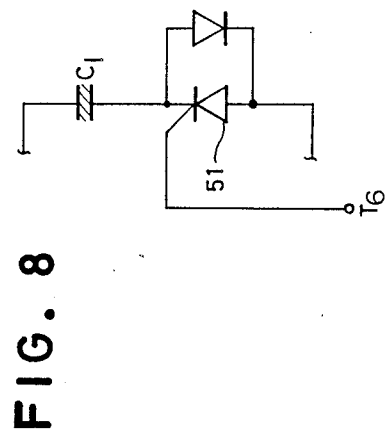
FIG. 8 is a circuit diagram showing an example of a switch used in the flash bulb driver.

FIG. 7 is a circuit diagram of the flash bulb driver 18 which controls the operation of both the flash bulb 3 for distance measurement and the flash bulb 17 for illuminating the subject with auxiliary light during photographing. Capacitors C1 and C2 are used to supply light emission energies to the flash bulbs 17 and 3, and are charged through a voltage booster 49. The capacitor is connected in series with a switch 50 which turns on when an H signal is applied to terminal T6 from the microcomputer 22 and turns off by an L signal. If a semiconductor switch such as a thyristor 51 shown in FIG. 8 is used as the switch 50, an H signal does not need to be continuously applied to the terminal T6 while charging the capacitor C1. Of the terminals provided for the flash bulb driver 18, a terminal T1 is for input of an oscillation start signal of the voltage booster 46, a terminal T2 is for input of an oscillation inhibit signal, a terminal T3 is for output of a charge completion signal of the capacitor C2, a terminal T4 is for input of a light emission trigger signal for the photographing flash bulb 17, and a terminal T5 is for input of a light emission trigger signal for the distance measuring flash bulb 3.

Next, the operation of the embodiment will be described with reference to FIG. 9. When a power switch (not shown) is turned on, e.g., by opening a lens cover or by another operation, the voltage booster 49 shown in FIG. 7 starts charging the capacitors C1 and C2. After a charge completion signal is supplied to the microcomputer 22, the preparatory stage for photographing is completed.

If the release switch 41 is turned on at the start of depressing a shutter button (not shown), power from the source Vcc is supplied to the AF controller 21. After the power source Vcc has been stabilized, a reset pulse is outputted from the reset pulse generator 43 shown in FIG. 6 to reset FF0 so that an H signal is outputted from the $\overline{Q}$ terminal thereof thereby to open the AND gate 44. At the same time, the counter 45 is reset.

The microcomputer 22 supplies clock pulses to the AF controller 21 after 100 msec delay from the time the release switch 41 is turned on. During this 100 msec period, the reference voltages Vna and Vnb of the comparators 31a, 31b, 32a, 32b, ..., 35a, 35b, 36a of the signal processor 20 are stabilized, and other necessary operations are performed. The clock pulses outputted from the microcomputer 22 are supplied via the AND gate 44 to the counter 45 to which the decoder 46 is connected. The decoder 46 controls the distance measuring sequence in accordance with the clock count value on the counter 45.

The decoder 46 supplies reset pulses to FFna and FFnb to reset them. Thereafter, the decoder 46 supplies a first trigger signal to the IRED driver 19 so that IRED 15 is maintained turned on for a predetermined period to project near-infrared light onto the subject, thus starting distance measurement for the close-up photographing range. After a predetermined time lapse after the first trigger signal is outputted, the decoder 46 outputs a read pulse Sig5 having a predetermined pulse width which is supplied to one of the terminals of the AND gates Gna and Gnb connected to the clock terminals of FFna and FFnb.

The other terminals of the AND gates Gna and Gnb are connected to the output terminals of the comparators 31a, 31b, 32a, 32b, ..., 35a, 35b, 36a of the signal processor 18. Therefore, while the read pulse Sig5 maintains H level, the binarized output signals Ana and Anb are supplied to FFna and FFnb. If a subject is located within the closeup photographing range, an H signal will appear at any one of the output terminals of the comparators 31b, 32b, ..., 35b having the lower reference voltage Vnb so that the corresponding FFnb is caused to be set. If light reflected from the subject is of high intensity, an H signal will also appear at one of the output terminals of the comparators 31a, 32a, ..., 36a having the higher reference voltage Vna.

Of the signals latched at 11 FFna and FFnb, six signals from FFna are first picked up. Next, six signals from FFnb are picked up. In particular, since the output signal Sigl of the decoder 46 is first of L level, the selectors 59 select five output signals from FFna to supply them to the input terminals D1 to D5 of the shift register. Since an output signal from FF6a is not connected to the selector, it is directly supplied to the input terminal D6. Thereafter, the decoder 46 outputs a signal Sig2 of H level and supplies it to the ON/OFF terminal of the shift register 48 so that six output signals from FFna are held in the shift register 48 as 6 bit data. When the output signal Sig2 becomes H level, the AND gate 55 becomes open. Therefore, clock pulses inputted via the AND gate 44 to the clock (CK) terminal of the shift register 48 pass through the AND gate 55 and are supplied to the microcomputer 22 as distance measuring clock pulses.

Every time a clock pulse is supplied to the CK terminal of the shift register 48, the 6 bit data held in the shift register 48 are shifted one bit after another while preserving the initial bit format, and sent to the microcomputer 22 as the distance measuring data. For example, assuming that only the output signal A4a among the six output signals is H level and therefore only the FF4a was caused to be set, the first distance measuring data "000100" are sent to the microcomputer 22.

After the first distance measuring data are sent, the signal Sigl of the decoder 46 becomes H level. Therefore, the five selectors 59 select five signals from FFnb and send them to the input terminals D1 to D5 of the shift register 48. As described previously, the five signals are held in the shift register 48 upon reception of the output signal Sig2 from the decoder 46, and thereafter they are sent to the microcomputer 22. For example, assuming that the output signals A4b and A5b among the output signals Anb are H level and accordingly FF4b and FF5b were caused to be set, the second distance measuring data "00011" are sent to the microcomputer 22.

To the first and second distance measuring data, flags D7 and D8 are added. The flag D7 determines whether the data are for the close-up photographing range or the ordinary photographing range, and the flag D8 determines whether the data are for the output signals Ana or Anb.

After the second distance measuring data have been sent, the decoder 46 outputs a measurement completion signal Sig6 of H level and sends it to one input terminals of a NAND gate 56. Since the other input terminal of the NAND gate 56 is supplied with an H signal from an OR gate 52, the output signal of the NAND gate 56 becomes L level. This L signal is supplied via an AND gate 57 and inverter 58 to the set terminal of FF0 as an H signal so that FF0 is caused to be set and the AND gate 44 is closed. Therefore, clock pulses are stopped and the counter 45 stops accordingly, thus completing the distance measuring sequence for the close-up photographing range.

Figure 2:
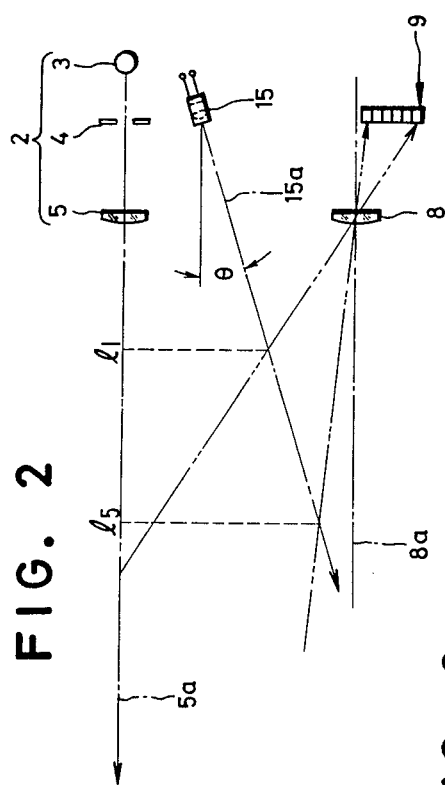
FIG. 2 is a side elevational view of the optical system shown in FIG. 1.
Figure 9:
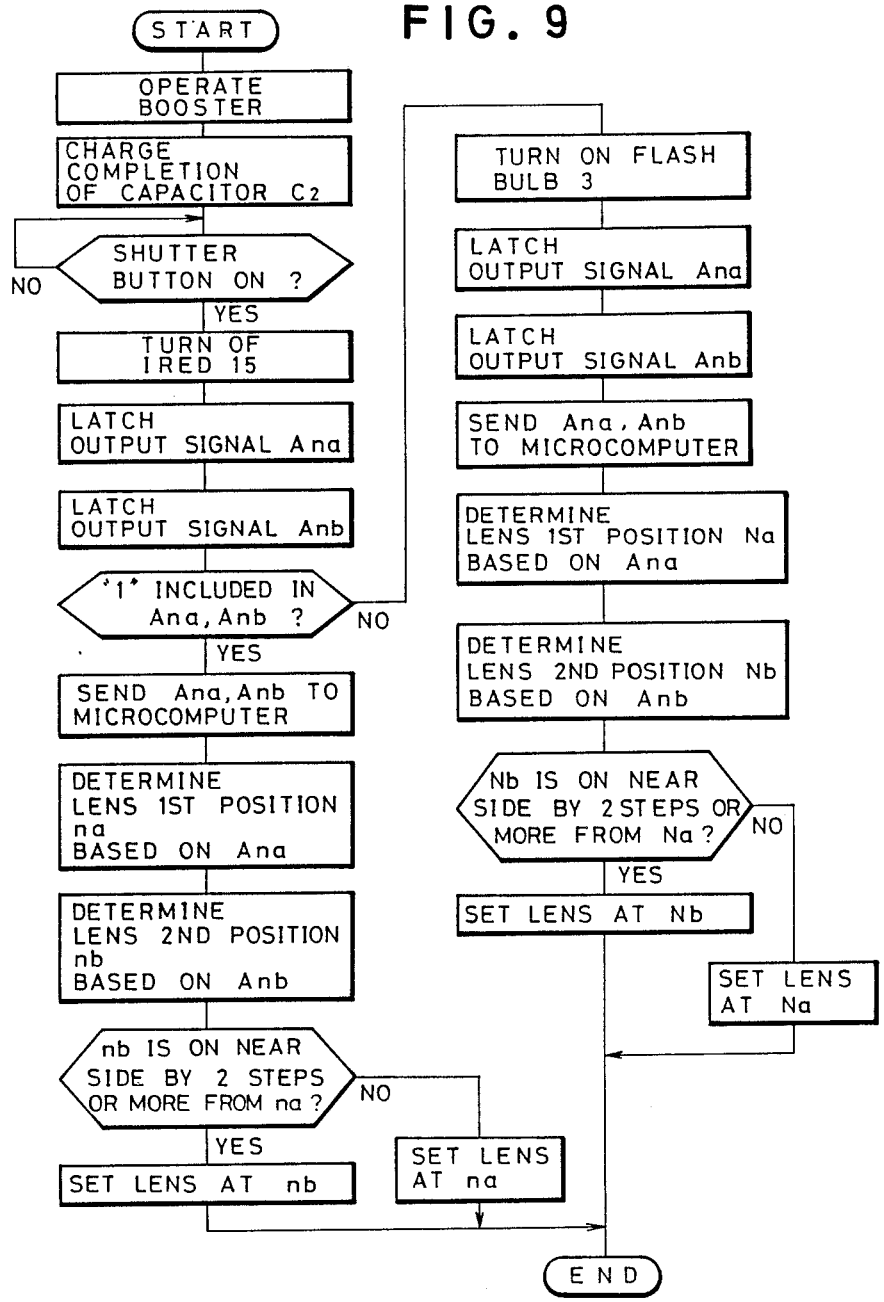
FIG. 9 is a flow chart showing the procedure of distance measurement.

After obtaining the distance measuring data for the close-up photographing range, the microcomputer 22 determines, as seen from the flow chart of FIG. 9, the first lens position in accordance with the first distance measuring data obtained from the output signals Ana, and the second lens position in accordance with the second distance measuring data obtained from the output signals Anb. Assuming that the first distance measuring data are "000100", n2 shown in FIG. 2 is determined as the first lens position. Further assuming that the second distance measuring data are "00011", n1 is determined as the second lens position with a priority on the near distance side. Since a light spot beam is applied to the subject when measuring a distance within the close-up photographing range, the reflected light is incident on two of the light receiving elements S1 to S6 at a maximum, and there is no case wherein the reflected light is incident on three light receiving elements. As a result, with priority on the near distance side, the first and second lens positions can be readily identified in accordance with the first and second distance measuring data.

After determining the first and second lens positions, the microcomputer 22 determines that the first lens position is the final lens position on condition that the second lens position is spaced from the first lens position by two steps or more. If the second lens position is nearer to the first lens position than two steps, the second lens position is determined as the final lens position. Thus, in the above example, n2 is determined as the final lens position.

In the distance measurement for the close-up photographing range, if no H signal is included in both the output signals Ana and Anb, and accordingly FFna and FFnb are not caused to be set, then an H signal is not outputted from the OR gate 52 so that the NAND gate 56 outputs an H signal and FF0 is not caused to be set. In such a case, a distance measurement for the ordinary photographing range is then performed.

Figure 13:
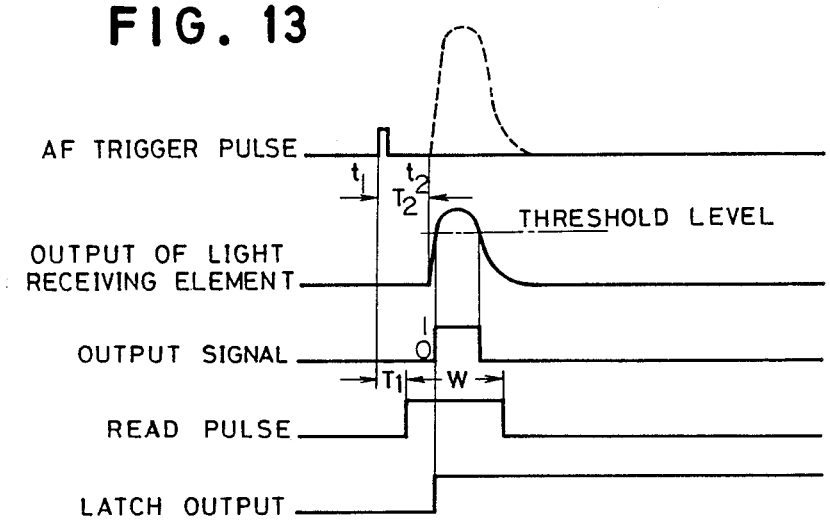
FIG. 13 is a timing chart illustrating a pick-up of the output of a light receiving element.
Figure 17:
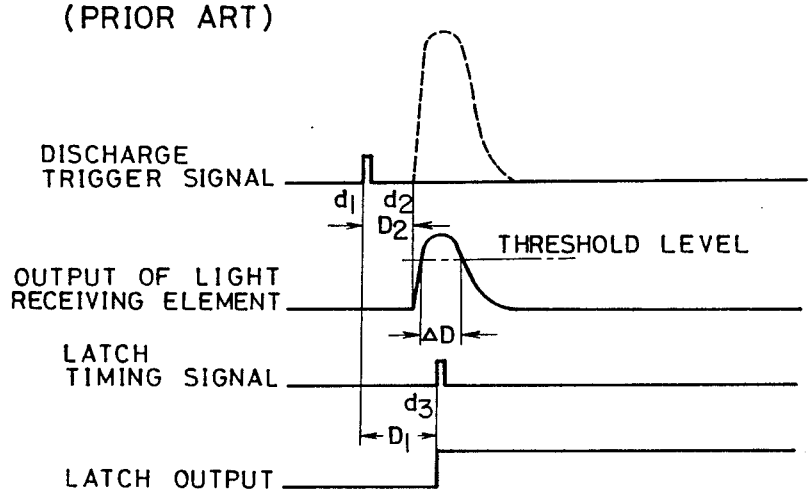
FIG. 17 is a timing chart illustrating the latching of the output of a light receiving element according to a conventional distance measuring device.

In the distance measurement for the ordinary photographing range, the microcomputer 22 supplies an H signal to the terminal T2 of the flash bulb driver 18 to stop the operation of the voltage booster 49. Thereafter, the decoder 46 supplies a reset pulse Sig4 to FFna and FFnb to reset them. The decoder 46 then supplies a second trigger signal to the terminal T5 of the flash bulb driver 18 at time t1 as shown in FIG. 13, so that the flash bulb 3 emits light by discharging the capacitor C2. The light emission start time t2 is at the time after a delay T2 from the time t1 when the second trigger signal was supplied. As the counter 45 has counted clock pulses corresponding in number to the predetermined period T1, starting from the time when the second trigger signal was generated, the decoder 46 then outputs a read pulse Sig5 having a predetermined pulse width so that the output signals Ana and Anb are latched at FFna and FFnb.

If a signal "1" is outputted from the comparator during the time period of the pulse width W of the read pulse Sig5, then the corresponding FFna or FFnb is caused to be set, so that the signal latched at the FFna or FFnb is inputted to the shift register 48. Thus, if the period T1 from the second trigger pulse generating time t1 to the read pulse Sig5 generating time, and the width W of the read pulse Sig5 are determined to have a sufficient margin for covering the different circuit elements and flash bulb characteristics among plural devices, then the outputs from the light receiving elements caused by light reflected from the subject can be reliably held in the shift register 48. Furthermore, even if an output signal is generated after the lapse of pulse duration time W after the read pulse Sig5 was generated, FFna and FFnb are not caused to be set so that there is no influence by the noises generated after the flash bulb 3 was illuminated.

As in the distance measurement for the close-up photographing range, so also in the distance measurement for the ordinary photographing range, the first and second distance measuring data for the output signals Ana and Anb are sequentially selected by the selectors 49 and sent to the microcomputer 22 via the shift register 48. Thereafter, the decoder 46 supplies an L signal Sig7 indicating a completion of the distance measuring sequence for the ordinary photographing range, to one input terminal of the AND gate 57. The AND gate 57 then outputs an L signal and supplies it via the inverter 58 to the set terminal of FF0 as an H signal. When FF0 is caused to be set, the AND gate is closed, thus completing the distance measuring sequence.

It is assumed by way of example that in the distance measurement for the ordinary photographing range, "011000" (FF2a and FF3a are set) are obtained as the first distance measuring data and "01110" (FF2b, FF3b and FF4b are set) are obtained as the second distance measuring data. The microcomputer 22 refers to the AF table 28 to determine the lens first and second positions in accordance with the first and second distance measuring data. As shown in the AF table 28 of FIG. 10, in determining the lens position for the normal photographing range, the subject brightness information (EV value) detected by the subject brightness measuring circuit 25 is also referred to.

Assuming that the EV value is "15", the first lens position for the first distance measuring data which indicate that the reflected light was incident to the light receiving elements S2 and S3, is determined as "N7" from the AF table 28 of FIG. 10. The second lens position for the second distance measuring data is determined as "N5" because the two light receiving elements S3 and S4 on the near distance side have a priority among those elements that have received reflected light equal to or more than three in number. In this case, since the second lens position is within two steps of the first lens position, the final lens position is determined as "N5". In the above embodiment, only the two light receiving elements on the near distance side have priority. However, it will be apparent that the lens position can be determined while considering many other light receiving elements if the data in the AF table 28 are increased.

If the result of the distance measurement for the ordinary photographing range shows the first distance measuring data of "000001", i.e., only FF6a is set, then the final lens position is determined as "n5". The reason for this is as follows. If the first distance measuring data for the ordinary photographing range are "00001", the data should have been detected by any one of the light receiving elements during measuring a distance in the close-up photographing range. Such a case often occurs under the condition that the reference voltages Vnb of the comparators 31b, 32b, . . . , 36b have been set high because of a possible high intensity of reflected light while measuring a distance in the close-up photographing range. Namely, if the reference voltages Vnb are set high to discriminate reliably among outputs from the neighboring light receiving elements, there is a tendency for the farthest position for the close-up photographing range to move to the near distance side. The above processing is effective to eliminate such a problem.

Upon determination of the lens position for the close-up or ordinary photographing range, drive pulses corresponding in number to the lens position are supplied from the microcomputer 22 to the motor driver 27 to move the taking lens 10. After the taking lens 10 is moved to the determined lens position, the lock of the shutter button is automatically released to allow taking a photograph. Upon further depressing the shutter button, the microcomputer 22 outputs an actuation signal to the shutter driver 24 so that the program shutter 23 with its aperture having a diameter corresponding to the EV value is opened and closed to take a photograph.

In the AF table 28, control data as indicated within a broken line are also stored. These control data, including light emission timing data, are used for controlling the built-in flash bulb 17 which projects auxiliary light onto the subject. In cases wherein the lens position is determined based on the data surrounded by the broken line in the AF table 28, the microcomputer 22 outputs an actuation pulse to the shutter driver 24 to make the aperture of the program shutter 23 assume the value stored in the AF table 28, and outputs a trigger pulse to the terminal T4 of the flash bulb driver 18. Thus, the flash bulb 17 emits light when the program shutter 23 assumes an aperture corresponding to the subject distance.

Figure 11:
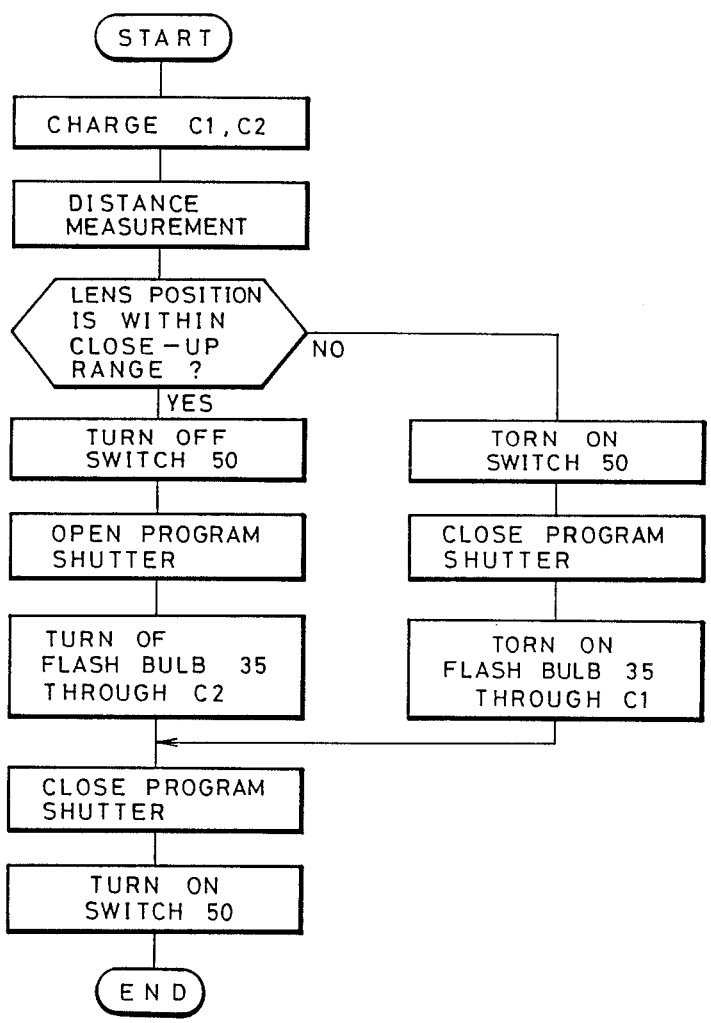
FIG. 11 is a flow chart showing the procedure of flash photographing.

If the distance measuring data are obtained for the close-up photographing range, the distance measurement is completed only by the light emission of IRED 15 as shown in the flow chart of FIG. 11. Thus, the charge in the capacitor C2 is kept as it is. In this case, the microcomputer 22 supplies an L signal to the terminal T6 of the flash bulb driver 18 to turn off the switch 50 connected in series to the capacitor C1. Thus, if a flash photographing is performed due to low brightness of the subject for the close-up photographing range, the flash bulb 17 emits light by the charge in the capacitor C2 upon reception of a trigger signal at the terminal T4 of the flash bulb driver 18, with the charge in the capacitor C1 being maintained as it is.

In such a case, since the capacitance of the capacitor C2 is less than that of the capacitor C1, the light emission amount of the flash bulb 17 will be small. However, by making the aperture of the program shutter 23 large to match the small light emission, it becomes possible to determine precisely the light emission timing of the flash bulb 17. If the distance measuring data are obtained for the ordinary photographing range, an H signal is supplied to the terminal T6 to turn on the switch 50 so that the flash bulb 17 emits light through the charge of the capacitor C1 to perform an ordinary flash photographing.

In the above embodiment, since a light spot beam is projected from IRED 15 while measuring a distance within the close-up photographing range, the lens positions are set in one-to-one correspondence with the light receiving elements. However, since the depth of focus of a subject becomes shallow in the close-up photographing range, the final lens position may be determined while taking into consideration the subject brightness information as previously described in connection with the AF table 28. Furthermore, the number of comparators to be connected to the light receiving element may be three or more, with different reference voltages applied thereto.

In the above embodiment, it is possible to measure a distance for the close-up photographing range. However, if the distance measurement for the close-up photographing range is not required, IRED 15 is omitted from the camera. As to the comparators of the signal processor, a single comparator may be provided for each light receiving element to simplify the circuit arrangement.

Figure 14:
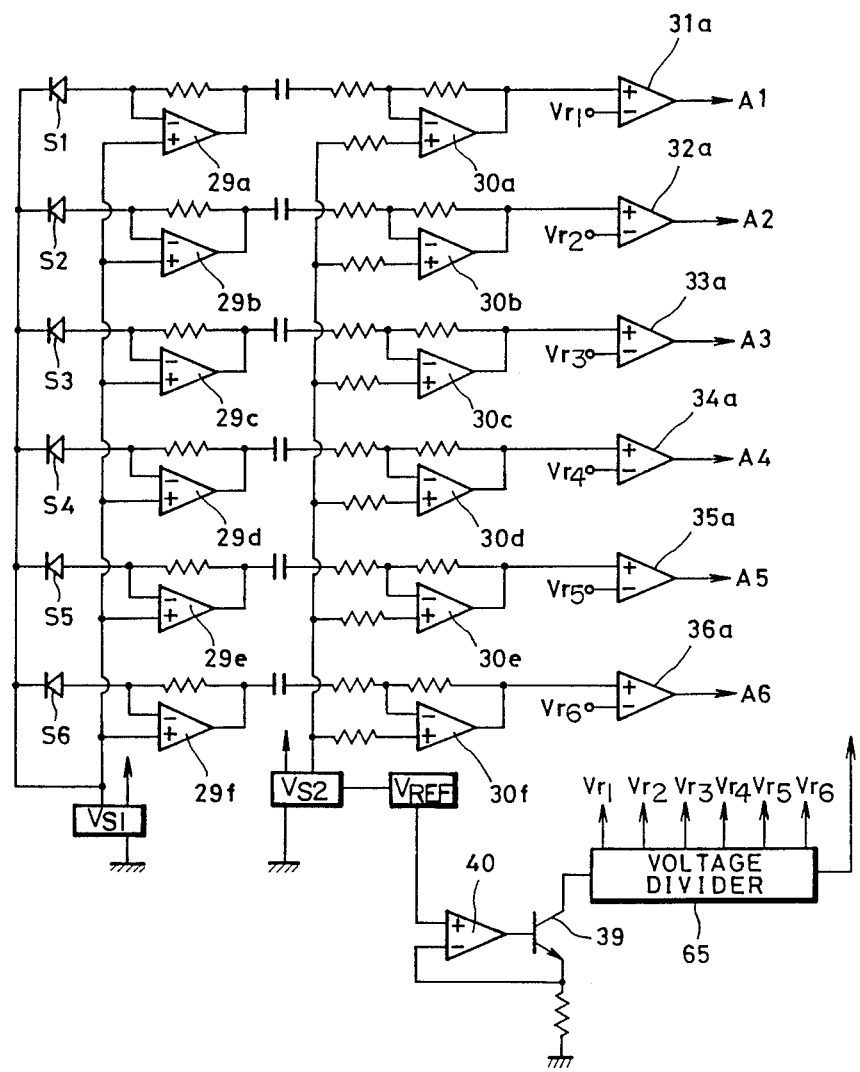
FIG. 14 is a circuit diagram of the signal processor used in the second embodiment of the distance measuring device which uses a single comparator for each light receiving element.

Next, the second embodiment of the distance measuring device with such a simple circuit arrangement will be described. FIG. 14 is a circuit diagram of a signal processor which uses a single comparator for each light receiving element. The signal processor is the same as that shown in FIG. 5 except that the comparators 31b, 32b, 33b, 34b and 35b are omitted therefrom, and similar circuit elements are designated by using identical reference numerals. Reference voltages Vr1 to Vr6 obtained from a voltage divider 65 are supplied to the reference voltage terminals of the comparators 31a to 36a. The reference voltages Vr1 to Vr6 are set lower o the side of the light receiving element S1 which receives light reflected from a far distant subject, and set higher on the side of the light receiving element which receives light reflected from a near distant subject. Namely, the reference voltages Vr1 to Vr6 are set as Vr1 < Vr2 < Vr6. With such an arrangement, the comparator 31a can reliably receive the output from the light receiving element S1 which receives weak light reflected from a far distant subject, while maintaining the amplification factors of the first and second operational amplifiers 29a to 29f, and 30a to 30f constant. On the other hand, since the reference voltage Vr5 of the comparator 36a for the light receiving element S5 which receives strong light reflected from a near distant subject is set high, false detection due to noises or cross-talk is reduced. If light reflected from a subject falls on any one of the light receiving elements S1 to S6, the corresponding comparator outputs a signal "1", and the comparators whose light receiving elements have not received reflected light output a signal "0".

The AF controller to be used in combination with the signal processor shown in FIG. 14 is the same as the AF controller 21 shown in FIG. 6 except that five FFnb and five selectors 59 are omitted therefrom, to obtain a single set of distance measuring data. In this embodiment, the light receiving element S6 is used for signaling a near distance in such a manner that upon reception of light reflected onto the light receiving element S6, an alarm device mounted on the camera is actuated. To this end, in the AF table 28 shown in FIG. 10, data indicating a near distance alarm are written in place of n5 data.

Figure 15:
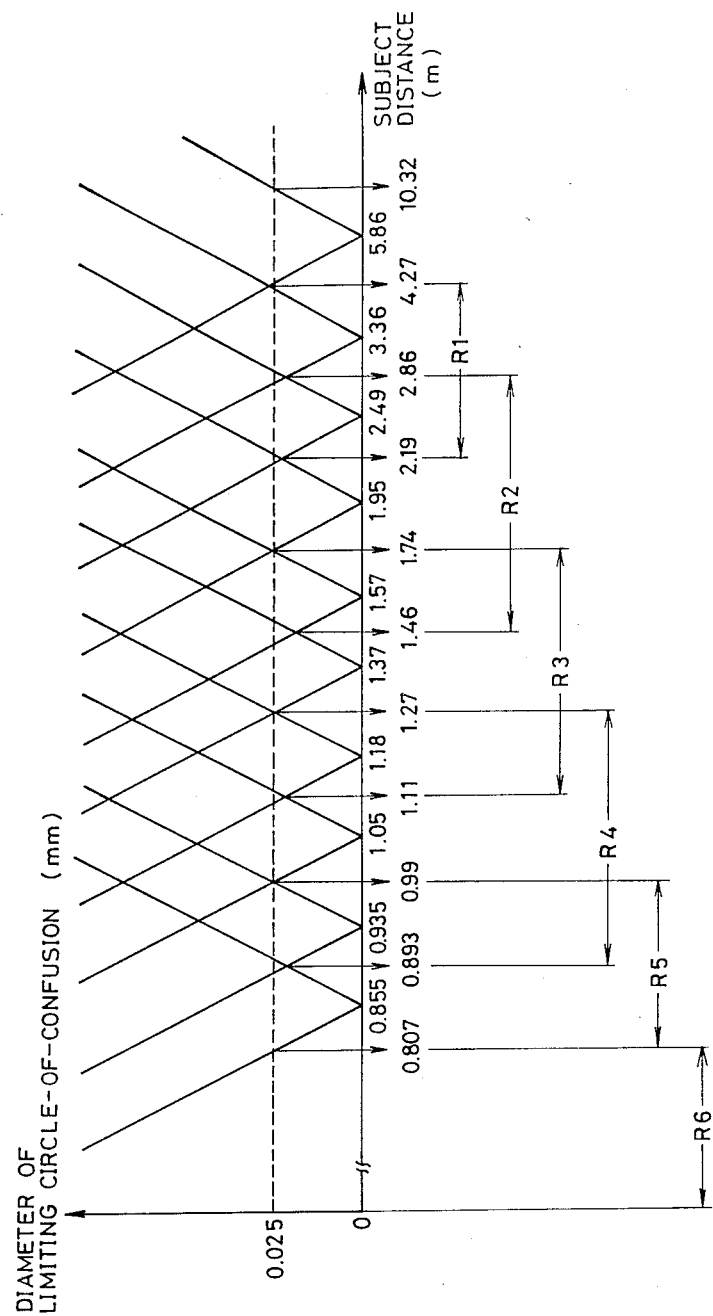
FIG. 15 illustrates the lens position relative to the subject distance according to the second embodiment of this invention.

FIG. 15 shows taking lens positions relative to subject distance. The taking lens 10 is set at one of 10 positions, e.g., 0.855 m, 0.935 m, 1.05 m, ..., 5.86 m which are optimum in-focus positions. Assuming that the diameter of the allowable limiting circle of confusion is 0.025 mm, the in-focus range can be regarded as being from 0.807 to 0.893 m at the taking lens 10 position of 0.855 m.

The distance measuring ranges covered by the light receiving elements S1 to S6 at the respective taking lens 10 positions are shown in Table 1 by way of example.

TABLE 1

| Light Receiving Elements | Distance Measuring Range (m) |
|---|---|
| S1 | R1: 2.19 to 4.27 |
| S2 | R2: 1.46 to 2.86 |
| S3 | R3: 1.11 to 1.74 |
| S4 | R4: 0.893 to 1.27 |
| S5 | R5: 0.99 to 0.807 |
| S6 | R6: Near Distance Alarm |

As can be seen from Table 1, the distance measuring ranges R1 to R5 overlap each other. As a result, light reflected from a subject at the overlapped position, e.g., at a distance of 1.5 m, falls on the two light receiving elements S2 and S3, and two outputs are obtained therefrom. The light receiving element S6 is used for a near distance alarm. When an output is obtained from the light receiving element S6, this signal is used as an alarm signal.

Figure 16:
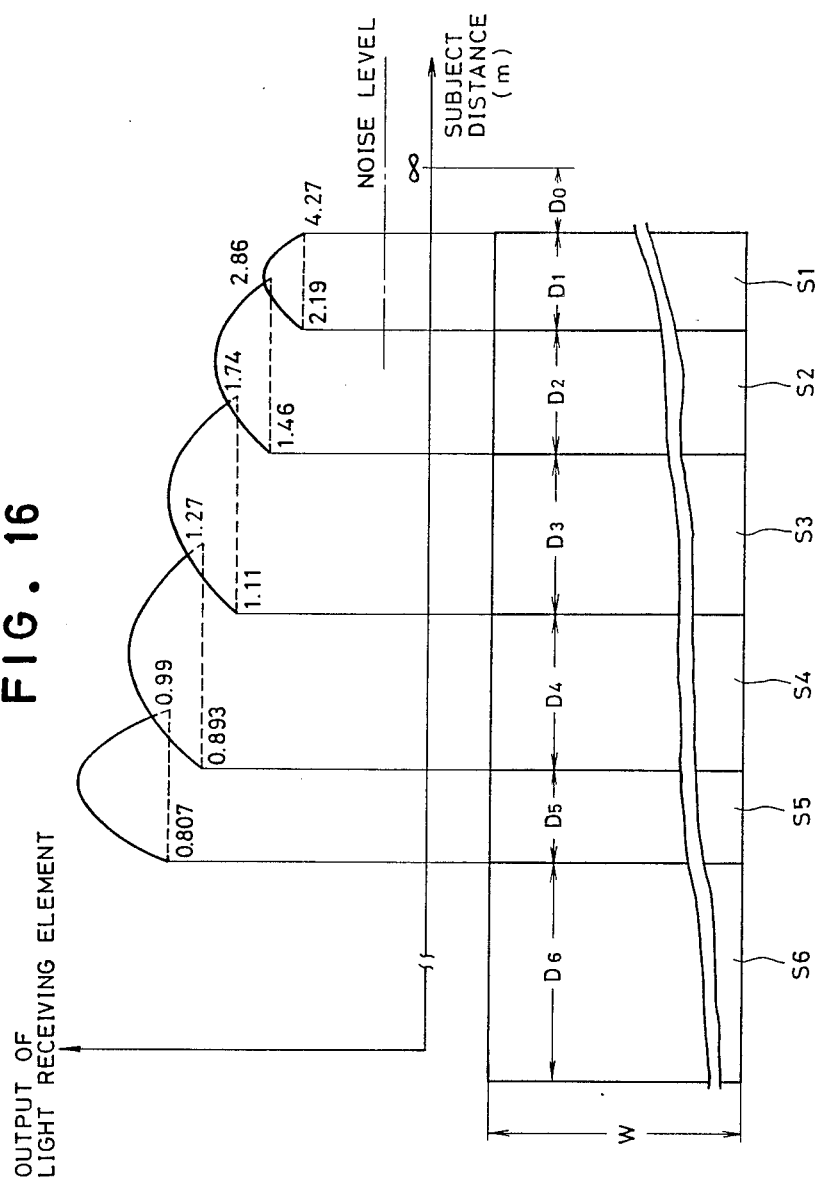
FIG. 16 illustrates the correlation between a light receiving element and the output thereof.

Each light receiving element S1 to S6 receives light reflected from within the distance measuring range R1 to R5 with a fixed distance range, and outputs a signal whose amplitude is sufficiently great to allow the comparator to output a corresponding signal, as understood from the foregoing description. To this end, the widths D1 to D5 of the light receiving elements S1 to S5 in the direction of the base line are determined as shown in FIG. 16. The right end of the light receiving element S1 is set at the farthest position of the distance measuring range R1, e.g., at the position wherein light reflected from a subject at a distance of 4.27 m can be detected. The output levels of the light receiving elements are determined such that the outputs of the second operational amplifiers 30a to 30f are two to three times as great as the noise level.

After determining the right end of the light receiving element S1, a test subject is moved to the nearest position of the distance measuring area R1, i.e., to the distance of 2.19 m. Then, the left end of the light receiving element S1 is determined when an output level the same as the first detected level is obtained. Thus, the width D1 can be determined. The width D1 can also be determined in such a manner that after determining the right end of the light receiving element S1 and moving the test subject to the distance of 2.19 m, a mask covering the front surface of the light receiving element S1 is gradually opened in the direction of the base line, and the distance the mask has moved at the time when the first output level is obtained is the width D1. Instead of such simulation, obviously the width D1 can be determined through computer analysis.

After determining the width D1 of the light receiving element S1, the right end of the next light receiving element S2 is positioned in contact with the left end of the light receiving element S1. Then the test subject is positioned at the farthest position of the distance measuring range R2, i.e., at the distance of 2.86 m. After measuring the output level at that position, the test subject is moved to the nearest position of the distance measuring range R2, i.e., at the distance of 1.46 m to determine the nearest end of the light receiving element S2 wherein the output level becomes the same as the first output level. Thus, the width D2 of the light receiving element S2 can be determined. In a similar manner, the widths D3 to D5 of the light receiving elements S3 to S5 are determined. The light receiving elements S1 to S6 may not be positioned in contact with the adjacent elements, but rather an optional clearance may be provided therebetween.

It will, of course, be understood that various changes and modifications may be made without departing from the scope of the present invention, which generally stated, consists in the matter set forth in the accompanying claims.

What is claimed is:

1. A distance measuring device having a light projecting unit for projecting light onto a subject, and a plurality of light receiving elements disposed in the direction of a base line for receiving light reflected from the subject, wherein the distance to the subject is determined based on the position of a light receiving element on which the reflected light falls, comprising:

comparing means having a plurality of comparators connected to said light receiving elements, respectively, each said comparator comparing an output signal of one of said light receiving elements connected thereto with a reference voltage supplied thereto to generate an output signal indicating whether the reflected light falls on said one light receiving element; and means for supplying different reference voltages to said comparators connected to said light receiving elements, respectively, one of said different reference voltages supplied to one of said comparators connected to one of said light receiving elements which is assigned to receive light reflected from a subject at a far distance being lower than another of said different reference voltages supplied to another of said comparators connected to another of said light receiving elements which is assigned to receive light reflected from a subject at a near distance.

2. A distance measuring device according to claim 1, further comprising storage means for storing said output signals of said comparators, and control means for enabling said output signals of said comparators to be stored in said storage means for a predetermined period of time after said light projecting unit starts projecting light.

3. A distance measuring device according to claim 2, wherein said storage means is a D-type flip-flop.

4. A distance measuring device according to claim 2, wherein said light projecting unit irradiates a slit light beam extending perpendicularly to the direction of said base line, said base line passing through said light projecting unit and said light receiving elements.

5. A distance measuring device according to claim 4, wherein each of said light receiving elements is rectangular in shape and has a longer side parallel to said extending direction of the slit light beam.

6. A distance measuring device according to claim 5, wherein said light projecting unit includes a flash bulb.

7. A distance measuring device according to claim 6, further comprising a second light projecting unit for projecting light onto a subject within a close-up photographing range.

8. A distance measuring device according to claim 7, wherein said second light projecting means is a light emitting diode which emits near-infrared light.

9. A distance measuring device according to claim 8, further comprising means for driving said light emitting diode to emit light to perform a distance measurement for the close-up photographing range, and if said output signals obtained do not satisfy a predetermined condition for the close-up distance measurement, for driving said flash bulb to project light to perform a distance measurement for an ordinary photographing range.

10. A distance measuring device having a light projecting unit for projecting light onto a subject, and a plurality of light receiving elements disposed in the direction of a base line for receiving light reflected from the subject, wherein the distance to the subject is determined based on the position of a light receiving element on which the reflected light falls, comprising:

comparing means being provided with a plurality of pairs of first and second comparators connected to said light receiving elements, respectively, each said pair of comparators comparing an output signal of one of said light receiving elements connected thereto with a first and second reference voltage and generating output signals each of which indicates whether the reflected light falls on said one light receiving element, respectively; and means for supplying a plurality of pairs of different first and second reference voltages to said pairs of comparators connected to said light receiving elements, respectively, in each of said plurality of first and second reference voltages, one of said reference voltages supplied to one of said first comparators connected to one of said light receiving elements which is assigned to receive light reflected from a subject at a far distance being lower than another of said reference voltages supplied to another of said comparators connected to another of said light receiving elements which is assigned to receive light reflected from a subject at a near distance.

11. A distance measuring device according to claim 10, further comprising storage means for storing said output signals of said pairs of first and second comparators, selecting means for selecting either output signals of said first comparators or output signals of said second comparators and sending said selected output signals to said storage means, and control means for enabling said selected output signals to be stored in said storage means for a predetermined period of time after said light projecting unit starts projecting light.

12. A distance measuring device according to claim 11, wherein said storage means is a D-type flip-flop.

13. A distance measuring device according to claim 11, wherein said light projecting unit irradiates a slit light beam extending perpendicularly to the direction of said base line, said base line passing through said light projecting unit and said light receiving elements.

14. A distance measuring device according to claim 13, wherein each of said light receiving elements is rectangular in shape and has a longer side parallel to said extending direction of the slit light beam.

15. A distance measuring device according to claim 14, wherein said light projecting unit includes a first light projecting element for projecting light onto a subject within an ordinary photographing range, and a second light projecting element for projecting light onto a subject within a close-up photographing range.

16. A distance measuring device according to claim 15, wherein said first light projecting element is a flash bulb, and said second light projecting element is a light emitting diode which emits near-infrared light.

17. A distance measuring device according to claim 16, further comprising means for driving said light emitting diode to emit light to perform a distance measurement for the close-up photographing range, and if said output signals obtained do not satisfy a predetermined condition for the close-up distance measurement, for driving said flash bulb to project light to perform a distance measurement for an ordinary photographing range.

18. A distance measuring device, comprising:

a discharge tube for projecting flash light for distance measurement onto a subject;

at least one photosensor for receiving a part of flash light projected by said discharge tube and reflected from the subject and generating an output signal indicative of a subject distance;

storage means for storing said output signal and generating distance measuring data therefrom; and control means for permitting said output signal to be sent to said storage means during a first preselected time period commencing at the end of a second preselected time period after a discharge trigger signal for causing said discharge tube to project flash light is applied to said discharge tube, and for preventing said output signal from being sent to said storage means after said first preselected time period has elapsed.

19. A distance measuring device according to claim 18, further comprising a comparator for comparing said output signal with a reference voltage to generate a binary signal which is supplied to said storage means.

* * * * *